United States Patent [19]

Paolini

[11] Patent Number: 4,745,631

[45] Date of Patent: May 17, 1988

[54] FLYING SPOT GENERATOR

[75] Inventor: Francis R. Paolini, Stamford, Conn.

[73] Assignee: North American Philips Corp., New York, N.Y.

[21] Appl. No.: 453,420

[22] Filed: Dec. 27, 1982

[51] Int. Cl.[4] .......................... G21K 1/02; G21K 5/10; H04N 3/04; H04N 5/32

[52] U.S. Cl. .................................... 378/146; 250/572; 350/274; 356/386; 356/431; 358/111; 358/203; 378/099

[58] Field of Search ................ 378/146, 099; 358/199, 358/203, 204, 214, 216, 111, 53, 63, 57; 250/562, 572, 237 R; 350/274, 275; 356/386, , 430, 387, 431

[56] References Cited

U.S. PATENT DOCUMENTS

| | | | |
|---|---|---|---|
| Re. 28,544 | 9/1975 | Stein et al. | 378/146 |
| 2,088,451 | 7/1937 | Thomas | 350/275 |
| 2,825,817 | 3/1958 | North | 378/146 |
| 3,100,847 | 8/1963 | Von Hacht | 250/237 |
| 3,619,626 | 11/1971 | Rudolph | 250/561 |
| 3,758,783 | 9/1973 | Sick et al. | 250/237 |
| 3,808,444 | 4/1974 | Schneeberger et al. | 378/146 |
| 3,884,816 | 5/1975 | Takahashi | 378/99 |
| 3,894,234 | 7/1975 | Mauch et al. | 378/146 |

*Primary Examiner*—Craig E. Church
*Assistant Examiner*—T. N. Grigsby
*Attorney, Agent, or Firm*—Paul R. Miller

[57] ABSTRACT

A flying spot generator is provided for changing a beam of x-rays into a flying spot moving in a linear direction over an object to be detected. The flying spot generator includes a rotating cylinder having even numbers of helical slots. A single long detector is provided behind the object for measuring the radiation characteristics of the object.

12 Claims, 1 Drawing Sheet

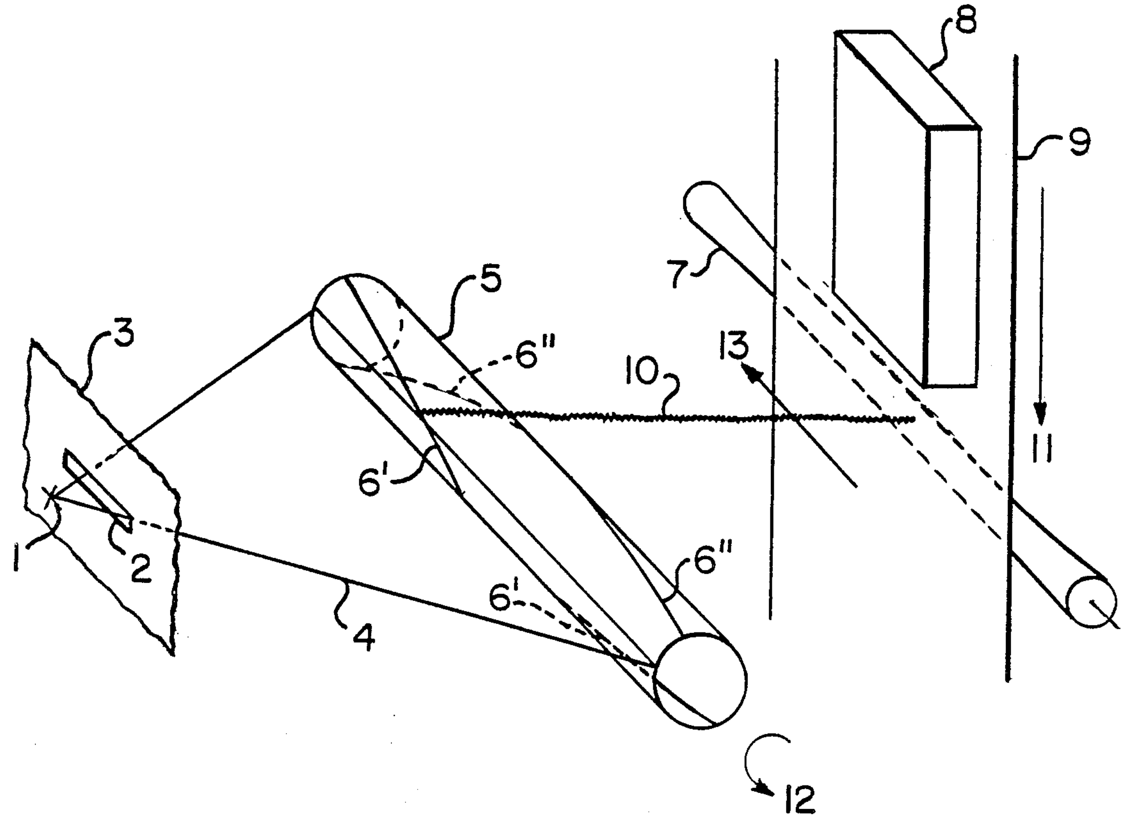
8
9
7
5
3
13
10
6''
11
6'
1
2
6''
6'
4
12

FLYING SPOT GENERATOR

The present invention is directed to apparatus for generating radiation to detect objects, such as objects in a baggage detection type structure. In particular, the present invention is directed to a flying spot type generator in which a beam of radiation is formed into a flying spot of the radiation which passes throguh objects to be inspected and is thereafter detected.

Flying spot type scanners have been suggested in the prior art, as may be seen in U.S. Pat. Nos. 3,808,444 to Schneeberger et al and 3,884,816 to Takahashi. Such previous schemes have suffered from the ability to produce output signals representing the entire dimension of the object being inspected. Moreover, large spot characteristics have been used which only achieves a coarse measurement. These prior art devices do not contribute to operable imaging systems.

Further, prior art scanners utilizing a scanning pencil beam of x-rays may be seen in U.S. Pat. No. Re. 28,544. This device involves a rotating disk having slots at the edges to form an x-ray for beam into a scanning pencil beam. Such an arrangement is relatively complicated in forming a scanning flying spot of radiation.

In the state of art radiographic security systems now used, such as used to inspect carry-on baggage for commercial airlines, semiconductor memory systems are provided to store a digitized, dissected x-ray image such as presented in U.S. application, Ser. No. 384,826, filed June 3, 1982, of which the present inventor is a co-inventor. Dissection of the image into its picture elements (pixels) is predominently achieved today in such arrangements by using a fan-shaped beam of x-rays through which the object passes on a conveyor belt , and a linear array of discrete x-ray detectors behind the object. This current technology uses on the order of 500 such discrete detectors which are usually photodiodes, and the subsequent electronic circuitry requires hundreds of current to voltage converters and preamplifiers, and several multiplexers. Such an arrangement is complex.

The present invention resides in a greatly simplified arrangement. Namely, a flying spot of x-rays is generated from a cylindrical shell with helical slots in which image readout takes place in a single long detector. This results in a great simplification of the readout circuitry.

Accordingly, the present invention defines a compact device for generating a flying spot of x-rays.

This arrangement essentially resides in a structure for the formation of a coarse fan-beam of x-rays which is directed onto a rotating elongated cylinder having at least two helical slots to form a flying spot of x-rays. The flying spot passes through an object to be detected and is then detected by an elongated detector.

The structure of the present invention may be more clearly seen by reference to the drawing FIGURE which illustrates without limitation an aspect of the present invention.

As may be seen in the drawing FIGURE, a source 1 of x-rays generates x-rays which through a collimating slit 2 defines a coarse fan beam 4 of x-rays. The slit is formed in a plane of x-ray absorbant material 3 and placed for directing the fan beam 4 onto a flying spot generator 5.

The flying spot generator 5 consists of an even number of helical shaped x-ray windows 6' and 6'', for example, which have been provided in a cylindrical shell 5.

The cylindrical shell 5 is of x-ray opaque material, such as lead. A practical device, however, could be formed of three concentric cylindrical shells in which an inner core is a shell of aluminum or other low x-ray absorbing material, an intermediate shell is of lead with the lead completely machined away in the requisite helical pattern, and an outer shell or cover of thin, low x-ray absorbing stainless steel. This arrangement could be approximately 12 inches long and 4 inches in diameter, and supported in a manner to permit rotation around its length. Such rotation may be at 3600 rpm with the support being by way of splitrace roller bearings along its length. The split helical pattern permits transmission of x-rays.

The number of x-ray windows 6' and 6'' need to be of an even number, such as the two illustrated in the drawing FIGURE. The windows are slits of a helical shape on opposite sides of the cylindrical shell, and the flying spot 10 appears when the two helixes 6' and 6'' intersect in the field of an incident x-ray beam.

Upon rotation of the shell the flying spot 10 transmitted through the flying spot generator 5 moves in a linear directon 13 from one end of the flying spot generator to the opposite end. Because of this movement of the flying spot, a single detector 7 is provided to detect an object 8 moving along a conveyor belt 9. The conveyor belt movement is in the direction 11, for example.

The detector 7 could be a single wire, long, high pressure gas counter tube. Such an arrangement might be filled with xenon and operated in a current measuring mode with a gas gain of the order of $10^2$ to $10^4$. The detector 7 could also be a photomultiplier with a long scintillator.

In this arrangement, an object 8 passing on the belt 9 would move through the moving flying spot which would pass back and forth over the object. The rotation of the shell or flying spot generator 5 generates the linear motion of the x-ray flying spot which passes along the detector 7. Image formation is retrieved from the detector by electronically sampling the detector signal and correlating the time of sampling with the angular position of the rotating shell.

In a practical arrangement of the present invention, the helical windows 6' and 6'' in the flying spot generator 5 are x-ray windows passing x-radiation. However, modifications to use gamma ray radiation, or other radiation, are also suitable.

While a single arrangement of the present invention has been illustrated and described, the present invention includes all variations and features which may be evident from the claims.

What I claim:

1. A flying spot generator comprising first means for forming a beam of radiation, second means for generating a flying spot of said radiation from said beam, said second means including a rotating cylinder having an even number of helical slots through which said beam passes to form said flying spot, said first means being located outside of the region occupied by said second means, third means for placing objects to be inspected in said flying spot, and fourth means for detecting said flying spot after traversing through said objects.

2. A flying spot generator according to claim 1, wherein said cylinder is of radiation absorbent material, and said helical slots pass said radiation.

3. A flying spot generator according to claim 2, wherein said flying spot is linearly directed along said fourth means for detecting.

4. A flying spot generator according to claim 3, wherein said fourth means for detecting is long and receives said flying spot in a linear arrangement.

5. A flying spot generator according to claim 4, wherein said radiation is x-radiation, and said helical slots pass x-rays.

6. A flying spot generator according to claim 4, wherein said third means moves said objects to be inspected through said flying spot.

7. A flying spot generator according to claim 6, wherein said third means is a conveyor arrangement.

8. A flying spot generator according to claim 1, wherein said radiation is x-radiation.

9. A flying spot generator according to claim 1, wherein siad radiation is x-radiation, and said helical slots pass x-rays.

10. A flying spot generator according to claim 1, wherein said third means is a conveyor arrangement for moving said objects to be inspected through said flying spot.

11. A flying spot generator according to claim 1, wherein said first means forms a fan beam of x-rays.

12. A flying spot generator comprising first means for forming a beam of radiation, second means for generating a flying spot of said radiation from said beam, said second means including a rotating cylinder having two helical slots through which said beam pases to form said flying spot, said first means being located outside of the region occupied by said second means, third means for placing objects to be inspected in said flying spot, and fourth means for detecting said flying spot after traversing through said objects.

* * * * *